Jan. 21, 1969  R. M. VAN HOUSE  3,422,935

DISC BRAKE ASSEMBLY

Filed Oct. 21, 1966

INVENTOR.
Robert M. Van House
BY
D. D. McGraw
ATTORNEY

United States Patent Office 3,422,935
Patented Jan. 21, 1969

3,422,935
DISC BRAKE ASSEMBLY
Robert M. van House, Dayton, Ohio, assignor to General Motors Corporation, Detroit, Mich., a corporation of Delaware
Filed Oct. 21, 1966, Ser. No. 588,546
U.S. Cl. 188—73                    12 Claims
Int. Cl. F16d 55/12

ABSTRACT OF THE DISCLOSURE

A disc brake assembly has a sliding caliper movable in a mounting bracket positioned on one side of the disc to be braked. The outboard shoe mounted in the caliper housing is offset from the center line of the piston engaging the inboard shoe, and the inboard shoe is positioned at a predetermined offset distance relative to the piston center line so that the moments generated by the brake apply forces and the resulting friction forces which tend to rotate the caliper and cause tapered lining wear are closely balanced to minimize effective caliper rotation and therefore minimize tapered lining wear. The precise amount of offset is determined by the reaction point on the caliper mounting bracket, the amount of allowable lining wear, and the coefficient of friction between the brake shoe lining and the disc friction surfaces.

---

The invention relates to disc brake assemblies for motor vehicle wheels and more particularly to those in which the brake shoes are so positioned in relation to reaction structure and brake force applying structure as to minimize brake lining tapered wear resulting from force couples generated during brake application which tend to rotate the caliper and lining. Structure embodying the invention is useful in a sliding caliper type of disc brake wherein the caliper housing slides on supporting structure which also takes brake reaction and transfers it to the chassis. Brake shoes are provided on opposite sides of a disc to be braked, with one of the shoes being secured to the caliper housing and the other shoe being slidable within the housing. A piston and cylinder arrangement in the housing is provided so that the piston urges the sliding shoe into braking engagement with one side of the disc, and the caliper moves in the opposite direction so as to pull the other shoe into braking engagement with the other side of the disc. As the brake shoes wear, the backing plate of the sliding shoe moves closer to the disc, and its point or line of contact with the reaction supporting structure is therefore moved toward the disc. Similarly, as the other shoe lining wears, the caliper housing moves in the opposite direction so that its point or line of contact with the reaction supporting structure moves away from the disc. The braking force applied by the piston and cylinder arrangement may be considered to exert a resultant braking force along an effective line of action which is the center line of the piston and cylinder when a single circular piston and cylinder is utilized. The resultant braking force acts at a point on the friction face of each shoe, which point is located at the center of gravity of the effective braking area of the shoe. The disc resists these resultant forces with equal and opposite forces. A resultant friction force is therefore generated at the center of gravity of the effective braking area of each shoe and is in the direction of rotation of the disc. With the reaction support structure being positioned on one side of the disc, and taking the reaction of the resultant friction forces either directly from the sliding shoe or from the caliper housing to which the secured shoe force has been transmitted, force couples are set up which tend to rotate the caliper housing in a chordal plane relative to the disc, thereby causing leading and trailing edges of the shoe linings to be urged in a similar pivotal movement, resulting in tapered lining wear. In a disc brake assembly embodying the invention, the center of gravity of the effective friction braking area of the shoe is positioned relative to the effective line of action of the cylinder and piston arrangement so that an opposing couple is generated which is substantially equal in force to the resultant friction force couple, thereby substantially cancelling the couple or moment tending to rotate the caliper housing and substantially eliminating the resulting tapered lining wear. Since in practice the resultant friction couple will change slightly as the lining wears, while the resultant brake applying force couple will not change, a compromise is provided wherein the reaction point or line and the location of the point of the center of gravity above discussed accomplishes the best overall result. Thus during extremes of brake lining conditions wherein the lining is of full thickness, and where is has worn to a point wherein it must be replaced, only small moments or couples will exist and the tapered lining wear will be negligible. It is within this context that the expressions describing the couples as being substantially equal and opposite are to be understood. The resultant friction force is a function of the coefficient of friction of the lining as it acts on the disc friction surface. This coefficient of friction will also vary during different operating conditions and therefore the resultant friction couple will vary with the same resultant brake applying couple. Therefore the distances at which the center of gravity of the effective shoe brake area and the point or line at which reaction is taken must be established to give satisfactory results in the range of friction coefficients usually occurring. The desired position for each shoe is therefore determined by the ratio of the distance between the center of gravity of the shoe effective braking area and the effective line of action of the piston and cylinder arrangement and the distance between the plane of the friction face of the shoe and the point or line at which the resultant reaction force is taken. This ratio should be the same as the coefficient of friction most commonly existing between the shoe lining and the disc friction face.

Figure 2:
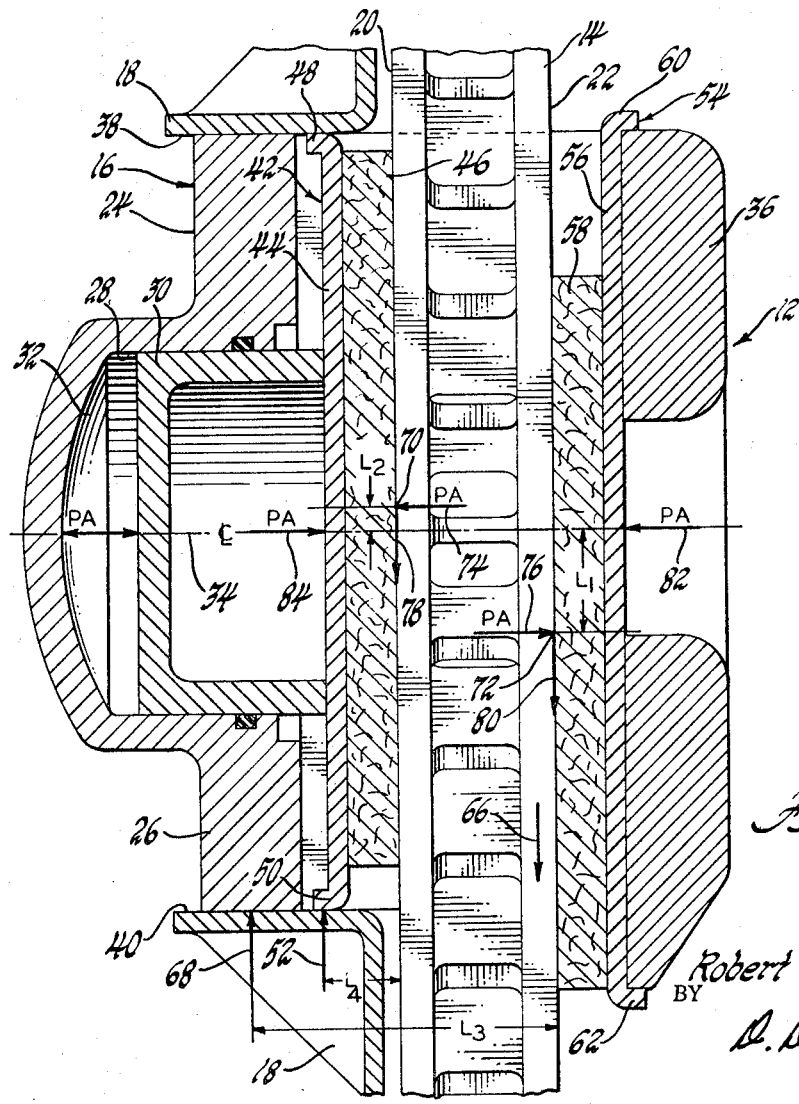
FIGURE 2 is a cross section view, with parts broken away, showing the disc brake assembly of FIGURE 1 and taken in the direction of arrows 2—2 of that figure.

The vehicle 10 has a front left wheel assembly 12 provided with a disc 14 which is to be braked by the disc brake caliper 16. A suitable caliper mounting bracket 18, which provides braking force reaction structure, is connected to a suitable part of the vehicle such as the steering knuckle of the front wheel suspension. The disc 14 has friction braking surfaces 20 and 22 on opposite sides thereof. The caliper assembly 16 includes a caliper housing 24, with one side 26 being formed to provide a pressure cylinder 28 in which a piston 30 is reciprocably received. The housing and the piston therefore define a pressure chamber 32 which may be pressurized to generate a braking force which is a function of the hydraulic pressure in the chamber 32 acting over the area of the piston 30. The resultant force so generated is identified in the drawing as forces PA and may be considered to act on the effective line of action 34 in equal and opposite directions so that the force exerted urging piston 30 to the right, as seen in FIGURE 2, is the same as the force exerted urging housing 24 to the left. The housing 24 extends radially outward and over an arcuate circumferential section of the disc 14 and then radially inward so that the housing side 36 is in alignment with the housing side 26, as seen in FIGURE 2. The bracket 18 is arranged to slidably receive the housing side 26 therein along abutment surfaces 38 and 40.

The brake shoe assembly 42 is slidably received within the housing 24 between the housing side 26 and the friction braking surface 20 of the disc 14. Piston 30 engages the backing plate 44 of the shoe assembly 42, and the brake lining 46 is secured to the backing plate and frictionally engageable with the disc surface 20. The ends 48 and 50 of the backing plate 44 slidably abut the reaction structure surfaces 38 and 40 so that braking reaction is effectively taken at the point or line indicated by arrow 52. It can be seen that as the brake lining 46 wears and the backing plate 44 moves to the right, the point or line at which the reaction forces will be taken also moves to the right.

Figure 1:
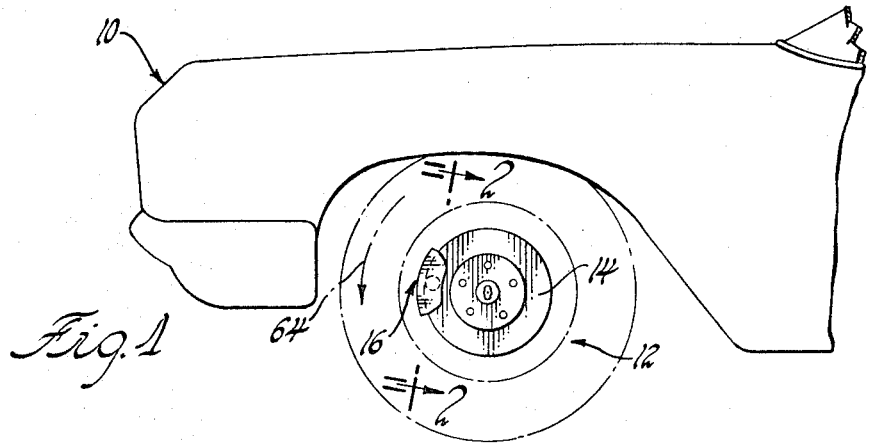
FIGURE 1 illustrates a portion of a vehicle having a disc brake assembly embodying the invention installed on the front left wheel thereof.

The brake shoe assembly 54 is secured to the caliper housing side 36 so that the backing plate 56 abuts the housing and the lining 58 is engageable in friction braking relation with the disc surface 22. The braking forces generated by braking action of the shoe assembly 54 on the disc 14 are transmitted to the housing by the backing plate ends 60 and 62 and through the housing to the reaction structure 18. When the disc is rotating in a forward direction of rotation as indicated by arrow 64 of FIGURE 1 and arrow 66 of FIGURE 2, the resultant point or line of reaction contact of the housing with the reaction assembly 18 is at the point or line indicated by arrow 68 and on reaction abutment 40. It can be seen that as lining 58 wears the resultant point of reaction will move leftwardly with the housing 24.

The resultant friction braking force PA may be considered to be applied to the disc by the shoe lining at the point constituting the center of gravity of the effective friction braking area of the shoe. The center of gravity of this area for shoe assembly 42 is indicated in FIGURE 2 by point 70 and for shoe assembly 54 by point 72. Arrows 74 and 76 respectively represent the resisting forces of the disc to the effective brake applying forces so exerted. A resultant brake friction force is generated which may be considered to act at point 70 for shoe assembly 42 which is indicated by arrow 78. A similar resultant friction braking force for shoe assembly 54 is indicated by arrow 80. This force is equal to the coefficient of friction between the lining and the disc surface times the force PA, as indicated in the drawing. It is this resultant friction braking force which is resisted by a reaction force indicated by arrow 52 for shoe 42 and arrow 68 for shoe 54. In carrying out the invention, point 72 of shoe assembly 54 is positioned a distance $L_1$ from the effective line of action 34. The point 70 of shoe assembly 42 is positioned a distance $L_2$ from the effective line of action 34. The point at which the resultant reaction force indicated by arrow 68 is exerted is positioned a distance $L_3$ from a plane defined by the friction braking surface of brake lining 58, which is also the plane of disc friction surface 22. The point at which the resultant reaction force indicated by arrow 52 is exerted is positioned a distance $L_4$ from a plane defined by the friction braking surface of brake lining 46, which is also the plane of disc friction surface 20. The force couple formed by the forces represented by arrows 68 and 80 acting through the distance $L_3$ tends to rotate the caliper 16 in a clockwise direction, as seen in FIGURE 2, and in a chordal plane relative to the disc 14. This couple is opposed by a substantially equal and opposite couple which is formed by the forces represented by arrow 76 and arrow 82, which represents the resultant brake apply force PA transmitted to the shoe assembly 54, acting through the distance $L_1$. It can thus be seen that when the distances $L_1$ and $L_3$ are properly established, these force couples will be substantially equal and opposite. Assuming no shoe wear and a constant coefficient of friction, the proper ratio of $L_1$ to $L_3$ would be equal to the coefficient of friction. However, since $L_3$ will increase slightly as lining 58 wears, while $L_1$ will remain the same, the distance ratio will change somewhat. Also, the coefficient of friction between the lining 58 and the disc 14 can vary to some extent due to different operating conditions. Therefore the distances $L_1$ and $L_3$ are chosen to provide minimum force couple imbalance so that the couples may be said to be substantially equal and opposite. Similarly, the force couple generated by forces represented by arrows 52 and 78 acting through distance $L_4$ is opposed by the force couple generated by the effective brake apply force PA illustrated by arrow 84 and the resisting force illustrated by arrow 74 acting through distance $L_2$. Thus the ratio of distance $L_2$ to distance $L_4$ is also established as the coefficient of friction between the lining 46 and the disc braking surface 20. The discussion above with regard to this ratio likewise applies, since distance $L_4$ will decrease as lining 46 wears and the friction coefficient will vary somewhat during different operating conditions.

I claim:

1. A disc brake assembly having a sliding caliper housing and a shoe arranged to frictionally engage a disc to be braked, actuating means having an effective line of action through which force is exerted on said shoe, the force so exerted by said actuating means generating a resultant braking force acting through the center of gravity of the friction braking area of said shoe and generating a resultant friction force at said center of gravity, a caliper mounting bracket having said caliper housing slidably mounted therein and providing reaction means taking reaction of said resultant friction force at a predetermined point, said center of gravity and said predetermined point being respectively positioned relative to said effective line of action and the plane of said shoe friction braking area to cause substantially equal and opposite couples to be generated by said resultant forces to effect a force balance on said shoe.

2. The disc brake assembly of claim 1, said caliper housing engaging said reaction means at said predetermined point and said shoe being secured to said housing and transmitting said resultant friction force to said housing.

3. The disc brake assembly of claim 1, said shoe engaging said reaction means at said predetermined point and transmitting said resultant friction force to said reaction means.

4. The disc brake assembly of claim 1, further comprising, second shoe arranged to frictionally engage the disc to be braked said resultant braking force applying means also applying a resultant braking force along said effective line of action and acting through the center of gravity of the friction braking area of said second shoe and generating a second resultant friction force at said second mentioned center of gravity, said reaction means also taking reaction of said second resultant friction force at a second predetermined point, said second mentioned center of gravity and said second predetermined point being positioned relative to said effective line of action and the plane of said second shoe friction braking area to cause substantially equal and opposite force couples to be generated by said resultant forces.

5. The disc brake assembly of claim 4, said first named shoe transmitting said first mentioned resultant friction force to said reaction means through said caliper housing and said second shoe transmitting said second resultant friction force directly to said reaction means.

6. The disc brake assembly of claim 5,
said first mentioned center of gravity being positioned on one side of said effective line of action and said second center of gravity being positioned on the opposite side of said effective line of action.

7. The disc brake assembly of claim 6,
said resultant braking force applying means including a piston and a cylinder formed in said housing, said piston acting on one of said shoes and said housing acting on the other of said shoes along said effective line of action.

8. The disc brake assembly of claim 4,
said first named shoe being secured to said caliper housing on one side of the disc to be braked, said second shoe being slidably movable in said caliper housing in the direction of said effective line of action, and said caliper housing being slidably movable on said reaction means in the direction of said effective line of action.

9. The disc brake assembly of claim 8,
said first mentioned center of gravity being spaced from said effective line of action in the direction of normal forward rotation of the disc to be braked.

10. The disc brake assembly of claim 8,
said second center of gravity being spaced from said effective line of action in the direction of normal reverse rotation of the disc to be braked.

11. A disc brake assembly comprising,
a sliding caliper housing, a disc to be braked, first and second brake shoes in said housing and respectively engaging opposite sides of said disc, cylinder and piston means in said housing generating braking forces along an effective line of action extending through said shoes,
a caliper mounting bracket having said caliper housing slidably mounted therein and including braking force reaction means on one side of said disc and providing resultant braking force reaction at first and second predetermined points for the resultant braking forces respectively generated by braking action of said first and second shoes,
said first and second shoes each having a center of gravity of effective shoe friction braking area, said first shoe center of gravity being positioned a distance $L_1$ from said effective line of action and said second shoe center of gravity being positioned a distance $L_2$ from said effective line of action and on the other side of the effective line of action from said first shoe's center of gravity,
said first predetermined resultant reaction point being positioned a distance $L_3$ from the plane of said first shoe effective friction braking area, and said second predetermined resultant reaction point being positioned a distance $L_4$ from the plane of said second shoe effective friction braking area, said shoes and said disc having a normally effective coefficient of friction, the ratios $L_1/L_3$ and $L_2/L_4$ being substantially equal to said coefficient of friction.

12. The disc brake assembly of claim 11,
wherein distance $L_3$ and $L_4$ respectively vary with wear of the first and second brake shoes and average distances are utilized to minimize the ratio change so that it remains substantially equal to said coefficient of friction.

References Cited

UNITED STATES PATENTS

| | | | |
|---|---|---|---|
| 3,119,468 | 1/1964 | Mossey | 188—73 |
| 3,166,159 | 1/1965 | Burnett | 188—73 |

FOREIGN PATENTS 1,387,368  12/1964  France.

GEORGE E. A. HALVOSA, *Primary Examiner.*